US010783174B1

(12) United States Patent
Lee et al.

(10) Patent No.: US 10,783,174 B1
(45) Date of Patent: Sep. 22, 2020

(54) SYSTEMS AND METHODS FOR COLLECTION, MANAGEMENT, AND DISTRIBUTION OF DATA USING A CROWDSOURCED KNOWLEDGE DATABASE

(71) Applicant: COUPANG CORP., Seoul (KR)

(72) Inventors: Yulhee Lee, Seoul (KR); Hyung Lee, Seoul (KR); Rowoon Lee, Seoul (KR); Hoyeon Bae, Seoul (KR); Dukwon Nam, Seoul (KR); Jaebong Sung, Seoul (KR); Hyebin Lee, Seoul (KR); Yonghee Lee, Seoul (KR); Pyunggang Kim, Seoul (KR); MoonJung Jang, Seoul (KR); Bora Moon, Seoul (KR)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 16/825,574

(22) Filed: Mar. 20, 2020

(51) Int. Cl.
*G06F 16/29* (2019.01)
*G06F 16/25* (2019.01)
*H04L 12/18* (2006.01)
*G06F 21/62* (2013.01)
*G06F 16/28* (2019.01)

(52) U.S. Cl.
CPC ............ *G06F 16/29* (2019.01); *G06F 16/258* (2019.01); *G06F 16/285* (2019.01); *G06F 21/6218* (2013.01); *H04L 12/1859* (2013.01)

(58) Field of Classification Search
CPC ..... G06F 16/29; G06F 16/285; G06F 21/6218
See application file for complete search history.

(56) References Cited

U.S. PATENT DOCUMENTS

| 2004/0268229 A1* | 12/2004 | Paoli | G06F 40/174 |
| | | | 715/200 |
| 2014/0316841 A1* | 10/2014 | Kilby | G06K 9/00442 |
| | | | 705/7.26 |

* cited by examiner

*Primary Examiner* — Loc Tran
(74) *Attorney, Agent, or Firm* — Finnegan, Henderson, Farabow, Garrett & Dunner LLP

(57) ABSTRACT

Systems and methods for collection, management, and distribution of data with a crowdsourced knowledge data base are disclosed. The systems and methods may be configured for: storing information in a standardized format in one or more network-based databases having a collection of records stored thereon; providing remote access to users over a network so any one of the users can update the information about a record in the collection of records in real time through a graphical user interface, wherein the one of the users provides the updated information in a non-standardized format; converting the updated information into the standardized format; storing the standardized updated information in the database in the standardized format; generating a message containing the updated information whenever one has been stored; and transmitting the message to all of the users over the network in real time, so that each user has immediate access to up-to-date information.

15 Claims, 18 Drawing Sheets

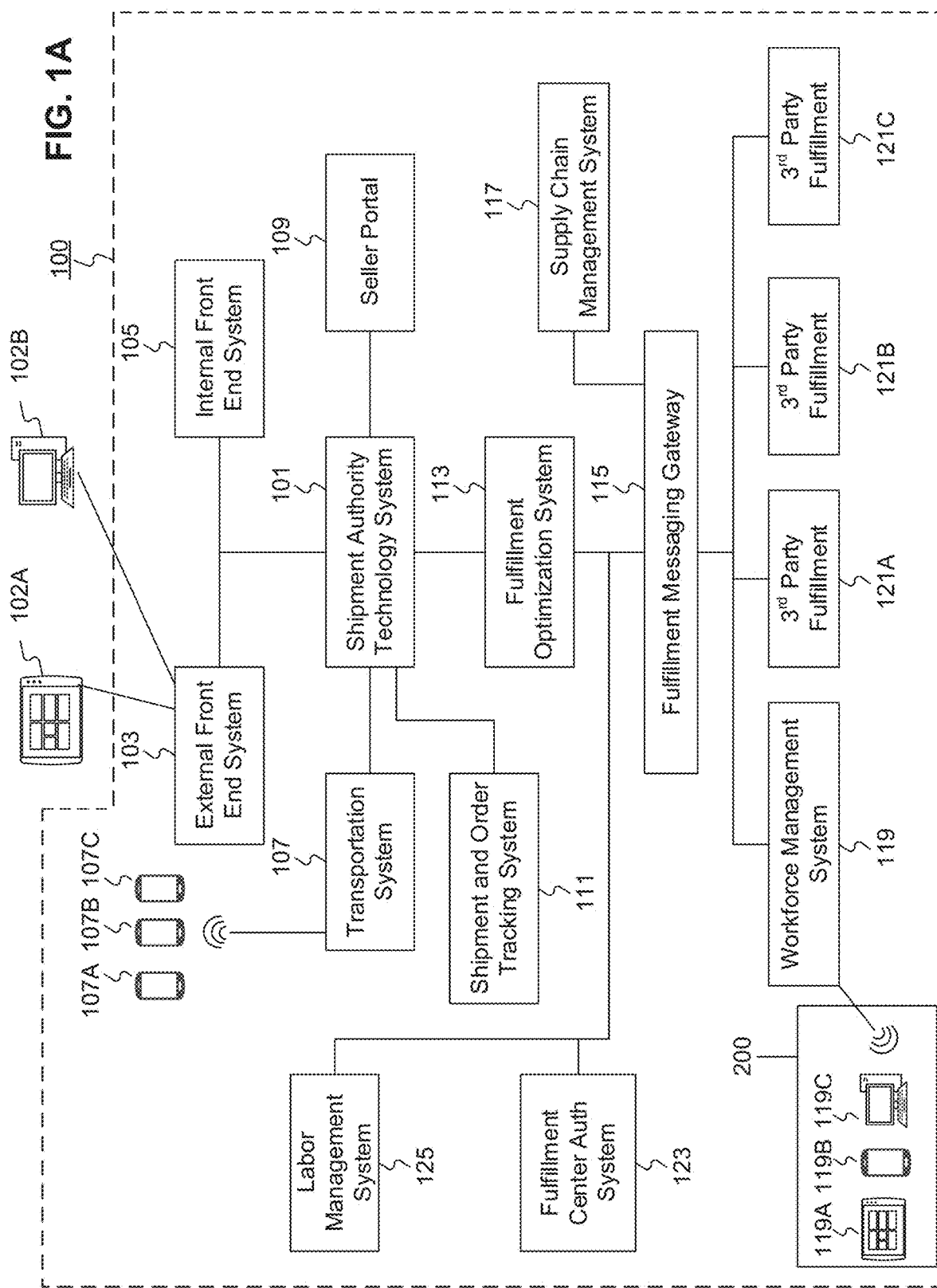

620

- ← NATE DELMONTE 🔔 ↺ ⊘ 📶🔋12:30
- Register Tip > | Community 12 | Unit 0 — 622
- Access Code | Register/Modify > — 624
- (Requested) Leave packages in the mailroom
- (Community)
  - Register packages at the mailroom
  - Enter through the loading dock
- (Unit) None
- 🔕 Do Not Ring  ⊘ Do Not Knock
- 📋 201-658-2145  📞  💬
- 165 W. Charles St. #1205, New York, NY 10015
- [Rejected] [Failed] [Completed]  ↱

621 — Register Tip
623 — Access Code
625 — Community tips
627 — Unit

- ← DELIVERY LIST 🔍 ▽ ↺ 📶🔋12:30
- Pending 120/159 | Complete 37 | Failed 2 | Rejected 0

610A
- Nate Delmonte
- 📍 165 W. Charles St. #1205, New York, NY 10015
- 🔑 5212433#
- 💡Tips  🔕 No Bell  ⊘ No Knock
- Register packages at the mailroom
- Leave packages in the mailroom
- (Detail)

611 — address/key
612 — tips
613 — instructions

610B
- Eunice Aguilera
- 📍 165 W. Charles St. #1801, New York, NY 10015
- 🔑 5212433#
- 💡Tips
- (Detail)
- >

| Warehouse ▼ | Route | Invoice ID | Name | Date 📅 | Status ▼ | Code ▼ | Submitted By ▼ | Search | Add Request |
|---|---|---|---|---|---|---|---|---|---|
| | | | | | | | | | Add Tip |

| ☐ Status | Address | Access Code | | Delivery Tip | | Submitted By | Date Submitted |
|---|---|---|---|---|---|---|---|
| ☐ Denied | 324 Broadway, #203 | Community New: 3030# Old: 9049# ~921 | | - | | catlove | 2019.11.01 21:22:55 |
| ☐ Denied | 456 Broadway, #409 | Unit New: 3030# Old: 8456# | | - | | catlove | 2019.11.01 21:22:55 |
| ☑ Pending | 1029 Charles St. | - | | Unit Recipient does not speak English | | daybyday4757 | 2019.11.01 16:22:40 |
| ☐ Approved | 232 Huntington Ave. Unit 5 | - | | Community Do not park in resident parking spots | | daybyday4757 | 2019.11.01 15:32:55 |
| ☐ Pending | 8901 Laurel Pl. #303 | - | | Unit Leave with the next door neighbor | | daybyday4757 | 2019.11.01 14:20:35 |
| ☐ Approved | 232 Huntington Ave. Unit 10 | - | | Community Do not park in resident parking spots | | daybyday4757 | 2019.11.01 15:32:55 |
| ☐ Pending | 506 New York Ave. Ste. 1209 | - | | Community Use the delivery truck entrance | | daybyday4757 | 2019.11.01 16:22:55 |

◁ 1 2 3 4 5 6 7 8 9 10 ▷

Deny | Approve

Access Code

| Warehouse | Upper East | Status | Pending |
|---|---|---|---|
| Route | 101 A | Recipient Name | Chris Jonathan |
| Date Submitted | 2019.12.04 16:24:50 | Submitted By | daybyday4747 |
| Date Approved | | Approved By | yesenglish |
| Address | 2232 Charles St. NE, New York, NY | | |
| Warnings | 🔇 🚫 | | |
| Community ▼ | #2020 | | |

1010A
1011  1012

Deny  Approve  } 1020

1030A { Community Code | Unit Code | Community Tip | Unit Tip

| Date Approved | Access Codes | Submitted By |
|---|---|---|
| 2019.12.04 16:24:50 | Security Guard/Key/1660* | daybyday4747 |
| 2019.12.03 16:20:55 | Security Guard/Key/1660* | catlove |
| 2019.12.02 16:32:59 | Security Guard/Key/1660* | daybyday4747 |
| 2019.12.01 16:26:55 | Security Guard/Key/1660* | catlove |

Delivery Tip ✕

| Warehouse | Upper East | Status | Pending |
|---|---|---|---|
| Route | 101 A | Recipient Name | Chris Jonathan |
| Date Submitted | 2019.12.04 21:22:55 | Submitted By | catlove |
| Date Approved | | Approved By | yesenglish |
| Address | 2232 Charles St. NE, New York, NY | | |
| Warnings | 🔇 🚫 | | |

1010B

Community ▾ — Use delivery truck entrance

1011

N/A 1014  1013

Image [+]  PARKING  ~ 1015

1020 { Deny  Approve }

1030B { Community Code | Unit Code | Community Tip | Unit Tip

| Date Approved | Delivery Tip | Submitted By |
|---|---|---|
| 2019.12.04 21:22:55 | Do not park in resident parking spots | daybyday4747 |
| 2019.11.17 19:42:45 | Use the delivery truck entrance in the back | catlove |

| Add a Delivery Tip | | | | ✕ |
|---|---|---|---|---|
| 901 Massachusetts Ave. | | Search | | |
| Date Submitted | 2019.11.01 21:22:55 | Submitted By | yesenglish | |
| Recipient Name | Margaret Balmer | Invoice | | |
| Address | 901 Massachusetts Ave. NW Ste. 304, New York, NY | | | |
| Warning | 🔇 ⊘ | | | |
| Community Code | #2020 | | | |
| Title/Keywords | User delivery truck entrance | | | |
| Explanation | Go through the delivery truck entrance at the back and drop off packages in front a door with plants at the far back corner | | | |
| Images ⊕ | [image] | | | |

Cancel    Add

SYSTEMS AND METHODS FOR COLLECTION, MANAGEMENT, AND DISTRIBUTION OF DATA USING A CROWDSOURCED KNOWLEDGE DATABASE

TECHNICAL FIELD

The present disclosure generally relates to computerized methods and systems for collection, management, and distribution of data with a crowdsourced knowledge database. In particular, embodiments of the present disclosure relate to inventive and unconventional systems that manage a crowdsourced knowledge database to facilitate collection and distribution of knowledge among a large number of sources.

BACKGROUND

Over the course of a person's life, as one goes through a wide variety of experiences, the person gains various insights that may be helpful for future activities. The person may share these insights with others through various means such as ordinary conversations, writings, advices, and demonstrations. People that learn the insights also, in turn, share them with others, leading to an organic transfer of knowledge.

Peer-to-peer knowledge transfer via direct interactions between people is often the most accurate means of transferring knowledge. However, its reach is limited to a small network of people that interacted with the original knowledge bearer. Reaching more people requires the recipients to share the knowledge with other people, which can introduce false memories (both intentional and unintentional) or cause the knowledge to deviate from its initial state. Books, media, and the Internet has substantially expanded the reach of knowledge transfer, but transfer of knowledge through such means flows largely from a knowledge bearer to recipients, where the recipient is unable to share his/her knowledge with the benefactor.

Some have attempted to solve these shortcomings through a technical solution enabled by advances in information technology and widespread adoption of computers. A web forum or a group chat room are common examples of such efforts, where participants can share information freely. However, information shared in these virtual forums are often accompanied by large amounts of noise (e.g., off-topic conversations). People share information in non-standardized ways (e.g., different words to mean the same thing, different syntax, typeo), which makes organizing and searching for a particular topic difficult. The forums may quickly spin out of control with only a handful of bad actors in the absence of moderators. They may enable false information to spread without check. Some knowledge may be lost over time because they are not circulated to new participants. Existing participants have already acquired the knowledge and may not be aware that the new participants have not, while the new participants are simply oblivious to the fact that such knowledge even existed.

The same difficulties arise within a company, where the company may wish to promote efficient and accurate transfer of knowledge between its workers. Without an effective means of preserving a veteran worker's know-hows and disseminating them to the rest of the workers, the company will need to expend a lot of resources to relearn the same knowledge over and over.

Therefore, there is a need for a network-based knowledge management system and method that collect, convert, and consolidate knowledge about different matters from various members at geographically dispersed areas into a standardized format.

SUMMARY

One aspect of the present disclosure is directed to a computer-implemented system for collection, management, and distribution of data with a crowdsourced knowledge database. The system may comprise: a memory storing instructions; and at least one processor configured to execute the instructions. The instructions may comprise: storing information in a standardized format about one or more addresses in one or more network-based non-transitory storage devices having a collection of geographical records stored thereon; providing remote access to users over a network so any one of the users can update the information about an address in the collection of geographical records in real time through a graphical user interface, wherein the one of the users provides the updated information in a non-standardized format dependent on a hardware and software platform used by the one of the users; converting the updated information into the standardized format; storing the standardized updated information about the address in the collection of geographical records in the standardized format; generating a message containing the updated information about the address whenever updated information has been stored; and transmitting the message to all of the users over the network in real time, so that each user has immediate access to up-to-date information.

Yet another aspect of the present disclosure is directed to a computer-implemented method for collection, management, and distribution of data with a crowdsourced knowledge database. The method may comprise: storing information in a standardized format about one or more addresses in one or more network-based non-transitory storage devices having a collection of geographical records stored thereon; providing remote access to users over a network so any one of the users can update the information about an address in the collection of geographical records in real time through a graphical user interface, wherein the one of the users provides the updated information in a non-standardized format dependent on a hardware and software platform used by the one of the users; converting the updated information into the standardized format; storing the standardized updated information about the address in the collection of geographical records in the standardized format; automatically generating a message containing the updated information about the address whenever updated information has been stored; and transmitting the message to all of the users over the network in real time, so that each user has immediate access to up-to-date information.

Still further, another aspect of the present disclosure is directed to a computer-implemented system for collection, management, and distribution of data with a crowdsourced knowledge database. The system may comprise: a memory storing instructions; and at least one processor configured to execute the instructions. The instructions may comprise: storing information in a standardized format about one or more addresses in one or more network-based non-transitory storage devices having a collection of geographical records stored thereon; providing remote access to users over a network so any one of the users can update the information about an address in the collection of geographical records in real time through a graphical user interface, wherein the one of the users provides the updated information in a non-standardized format dependent on a hardware and software platform used by the one of the users; converting the non-standardized updated information into the standardized format; storing the standardized updated information about the address in the collection of geographical records in the standardized format; generating a first message containing the updated information about the address whenever updated information has been stored; receiving a signal, in response to the first message, approving the updated information; generating a second message containing the approved information about the address in response to the signal; and transmitting the second message to all of the users over the network in real time, so that each user has immediate access to up-to-date information.

Other systems, methods, and computer-readable media are also discussed herein.

BRIEF DESCRIPTION OF THE DRAWINGS

FIG. 1A is a schematic block diagram illustrating an exemplary embodiment of a network comprising computerized systems for communications enabling shipping, transportation, and logistics operations, consistent with the disclosed embodiments.

FIGS. 6A-6B are exemplary embodiments of a list view UI displaying a more detailed view of records, consistent with the disclosed embodiments.

FIGS. 7A-7C are exemplary embodiments of a knowledge entry view UI with which a user can view knowledge entries registered for a particular record, consistent with the disclosed embodiments.

FIGS. 8A-8C are exemplary embodiments of a new knowledge entry submission UI with which a user can submit a new knowledge entry, consistent with the disclosed embodiments.

FIG. 9 is an exemplary embodiment of a knowledge entry management UI displaying a list of knowledges submitted by users, consistent with the disclosed embodiments.

FIGS. 10A-10B are exemplary embodiments of knowledge entry detail view UIs, consistent with the disclosed embodiments.

FIGS. 11A-11B are exemplary embodiments of admin knowledge entry submission UIs, consistent with the disclosed embodiments.

DETAILED DESCRIPTION

Figure 1B:
FIG. 1B depicts a sample Search Result Page (SRP) that includes one or more search results satisfying a search request along with interactive user interface elements, consistent with the disclosed embodiments.
Figure 1C:
FIG. 1C depicts a sample Single Display Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods that make up a crowd-sourced database. With the database, the systems and methods enable efficient transfer of knowledge among a large number of users. Specifically, knowledges shared by the users are converted into a standard format, reviewed by moderators, and stored in a crowd-sourced database, which are then made available to the users in real-time. The embodiments disclosed herein correspond to a particular use case in the context of an e-commerce company, utilizing the disclosed crowd-sourced database for maintaining a repository of delivery tips submitted by its delivery workers. However, the disclosed systems and methods are widely applicable to different use cases, and the crowd-sourced database may store a variety of information as needed.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, workforce management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
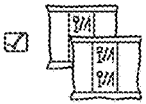
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front-end system 105, in some embodiments, may be implemented as a computer system that enables internal users (e.g., employees of an organization that owns, operates, or leases system 100) to interact with one or more systems in system 100. For example, in embodiments where network 101 enables the presentation of systems to enable users to place an order for an item, internal front end system 105 may be implemented as a web server that enables internal users to view diagnostic and statistical information about orders, modify item information, or review statistics relating to orders. For example, internal front-end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front-end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from workforce management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfillment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfillment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Workforce management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 1196, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMA 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
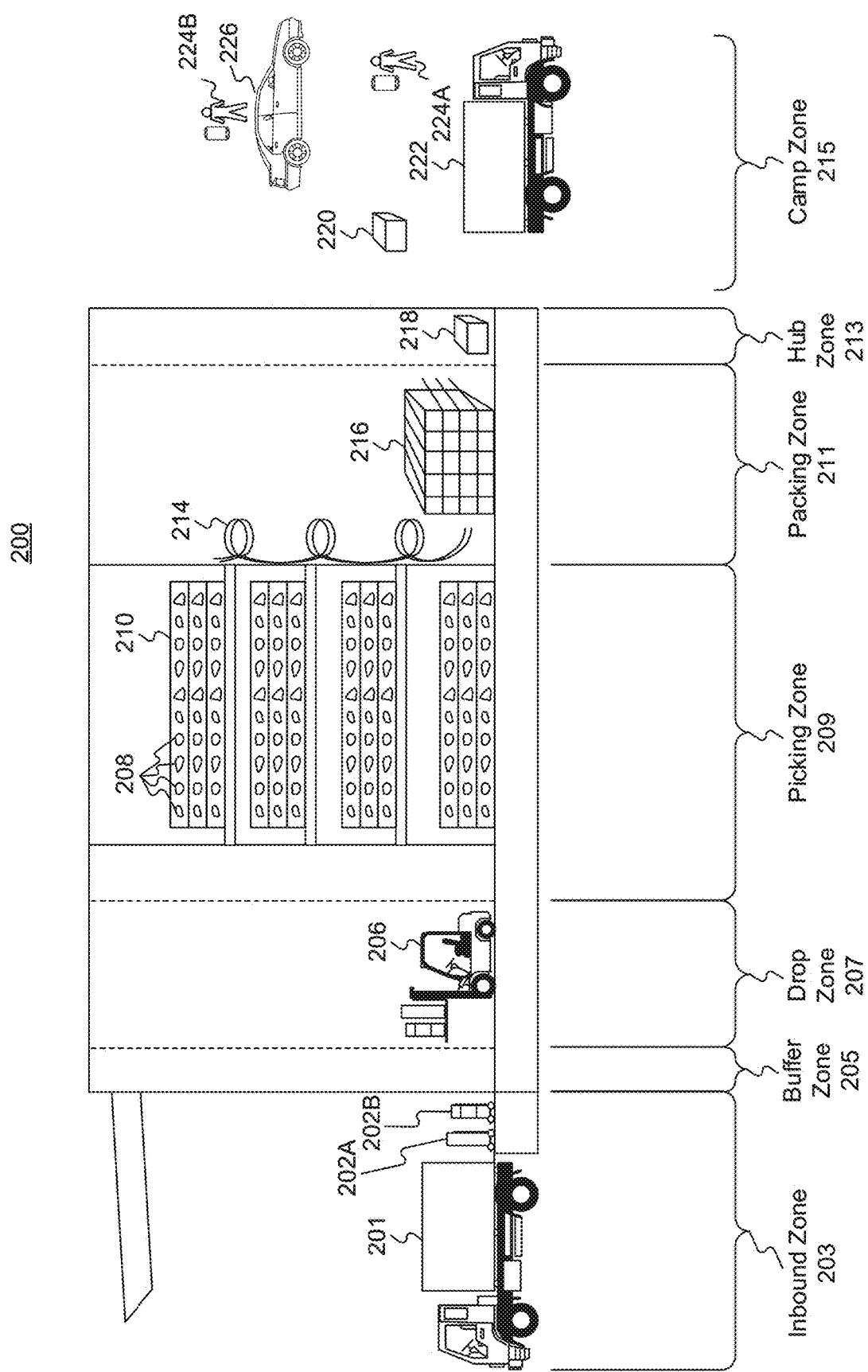
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
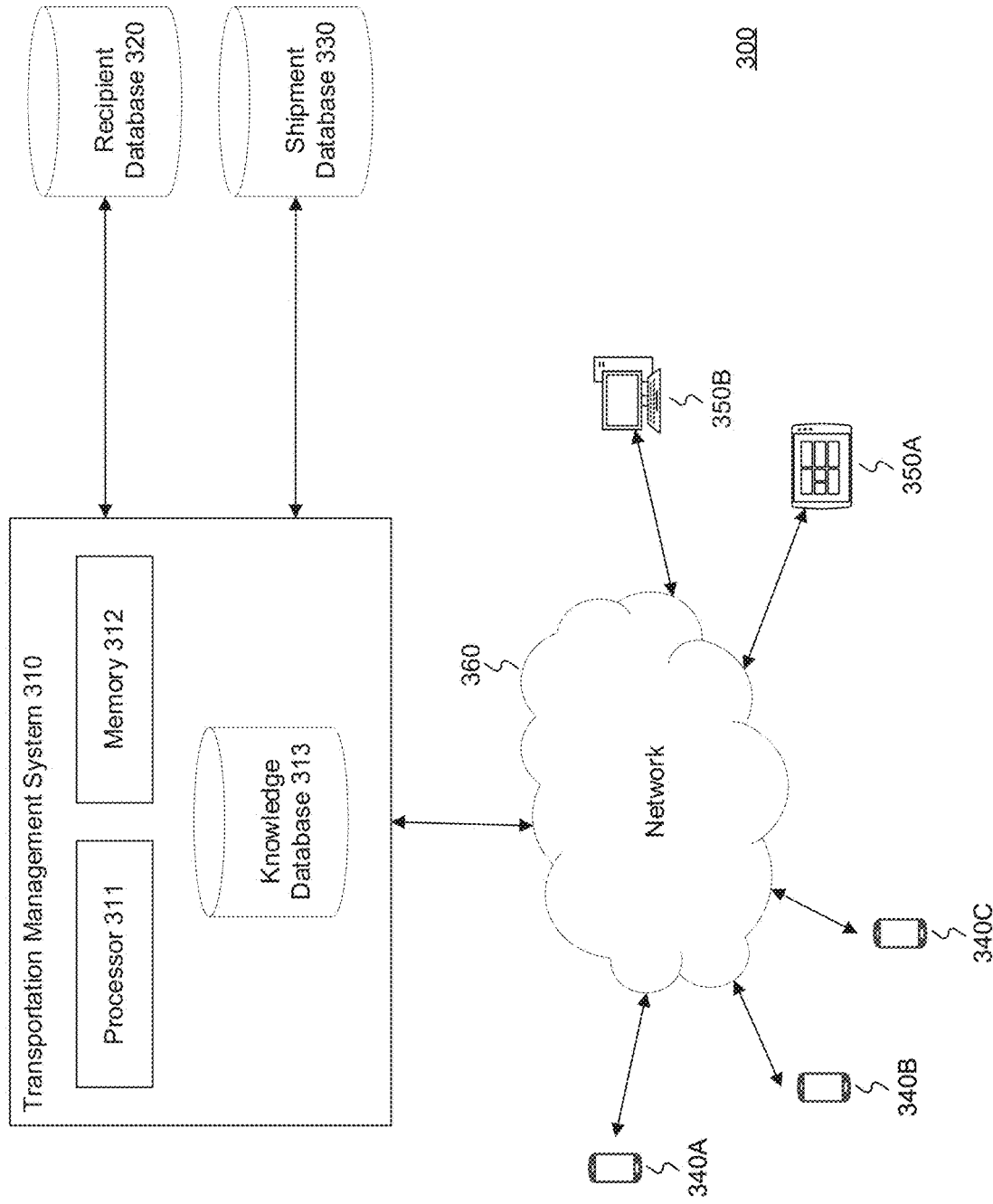
FIG. 3 is a schematic block diagram illustrating an exemplary embodiment of a computerized system for collection, management, and distribution of data with a crowd-sourced knowledge database, consistent with the disclosed embodiments.

FIG. 3 depicts a schematic block diagram illustrating an exemplary embodiment of an interface diagram 300 utilizing a crowd-sourced knowledge database (KDB) 313. The exemplary embodiment comprises transportation management system (TMS) 310 in communication with a recipient database 320, a shipment database 330, and a plurality of devices (e.g., client devices 340A-340C and admin devices 350A-350B). In some embodiments, TMS 310 may correspond to one or more of the systems shown in FIG. 1A such as the transportation system 107. In other embodiments, TMS 310 may be a separate system in communication with one or more of the systems shown in FIG. 1A. In some embodiments, recipient database 320 and shipment database 330 may comprise a collection of external databases that communicate with TMS 310, providing TMS 310 with information necessary for processing and presenting knowledge stored therein. In some embodiments, the external databases may correspond to one or more systems shown in FIG. 1A or obtain information from one or more of the systems. In some embodiments, TMS 310, recipient database 320, and shipment database 330 may communicate via one or more public or private network connections including the Internet, an intranet, a WAN (Wide-Area Network), a MAN (Metropolitan-Area Network), a wireless network compliant with the IEEE 802.11a/b/g/n Standards, a wired network, or the like.

TMS 310, in some embodiments, may be implemented as a computer system that aggregates, maintains, and distributes crowd-sourced knowledge gathered from users. In some embodiments, TMS 310 may comprise one or more processors 311, one or more memories 312 (i.e., non-transitory computer-readable media), and a KDB 313. TMS 310 may take the form of a server, general-purpose computer, a mainframe computer, a special-purpose computing device, a distributed computing system, or the like. TMS 310 may be a standalone system, or it may be part of a subsystem, which may be part of a larger system.

KDB 313 may be configured to store information (i.e., knowledge) collected and accrued over time. In some embodiments, KDB 313 may comprise one or more hard disk drives, one or more solid state drives, one or more non-transitory memories, or any combination thereof. In some embodiments, KDB 313 may also comprise a distributed network of databases providing redundancy, increased storage capacity, and/or ability to support multiple users simultaneously.

Information within KDB 313 may be organized in a predetermined structure, where each knowledge entry (e.g., a knowledge shared by a user) is assigned to one or more elements of the predetermined structure. In the particular use case described herein, for example, KDB 313 may be configured to store knowledge shared by delivery workers. The predetermined structure may include, for example, a hierarchy, a tree structure, or a class and subclasses in the context of Object-oriented programming.

In some embodiments, the information stored within KDB 313 may be organized by address, where a knowledge entry (e.g., a delivery tip about a particular address) is assigned to an element within KDB 313 corresponding to the particular address. Elements may further be organized in groups, such as by state, city, or zip codes to facilitate indexing or searching. In further embodiments where one or more addresses correspond to units or suites within a community (i.e., a group of addresses that share a limited number of common entrances such as a private gated community, building, or apartment), elements in KDB 313 may correspond to the individual suites or units, a collection of which may be grouped together within KDB 313. An element that corresponds to an address belonging to a single postal unit (e.g., a single-family home, an apartment unit) may be called a unit element, and an element that corresponds to a community may be called a community element. In some embodiments, a knowledge entry may be assigned to a group of elements such as a group corresponding to a particular community. In such embodiments, the knowledge entry may be called a community-level entry and be associated with all of the elements in the group. A knowledge entry assigned to a unit element may be called a unit-level entry. For example, a delivery tip about the location of a mailroom in a community may be assigned to a community element in KDB 313 corresponding to the community, and the delivery tip may be associated with individual units within the community.

In some embodiments, information on individual elements of KDB 313 may be initially populated with information from external databases such as recipient database 320 and shipment database 330. For example, TMS 310 may create elements within KDB 313 to correspond to recipient addresses provided by recipient database 320. The elements may then be associated with knowledge entries submitted by delivery workers as they accrue knowledge on particular recipient addresses while delivering packages. Here, TMS 313 may create, modify, or remove elements from KDB 313 as recipient addresses from recipient database 320 is updated. In some embodiments, TMS 310 may also utilize information pulled from external databases such as shipment database 330 to display useful information along with appropriate knowledge entries as to be described below.

In some embodiments, information stored in external databases such as recipient database 320 and shipment database 330 may have been generated by one or more systems depicted in FIG. 1A such as shipment authority technology system 101, shipment and order tracking system 111, and fulfillment optimization system 113.

In some embodiments, users may access KDB 313 using a plurality of devices such as client devices 340A-340C and admin devices 350A-350B through a network 360. In some embodiments, client devices 340A-340C may include mobile devices 107A-107C described above. Users may access existing knowledge entries stored in KDB 313 or submit new knowledge entry using client devices 340A-340C. Client devices 340A-340C may comprise any personal computing devices such as mobile phones, smart phones, PDAs, tablets, or PCs. In some embodiments, a subset of the users may access knowledge entries in KDB 313 through admin devices 350A-350B in order to manage knowledge entries stored in KDB 313. Admin devices 350A-350B may also comprise any personal computing devices such as mobile phones, smart phones, PDAs, tablets, or PCs. In some embodiments, admin devices 350A-350B may be specific devices specialized or dedicated to managing the entries in KDB 313. In addition or alternatively, admin devices 350A-350B may be a subset of client devices 340A-340C preauthorized with special privileges or operating in an authenticated session by an authorized user.

Figure 4:
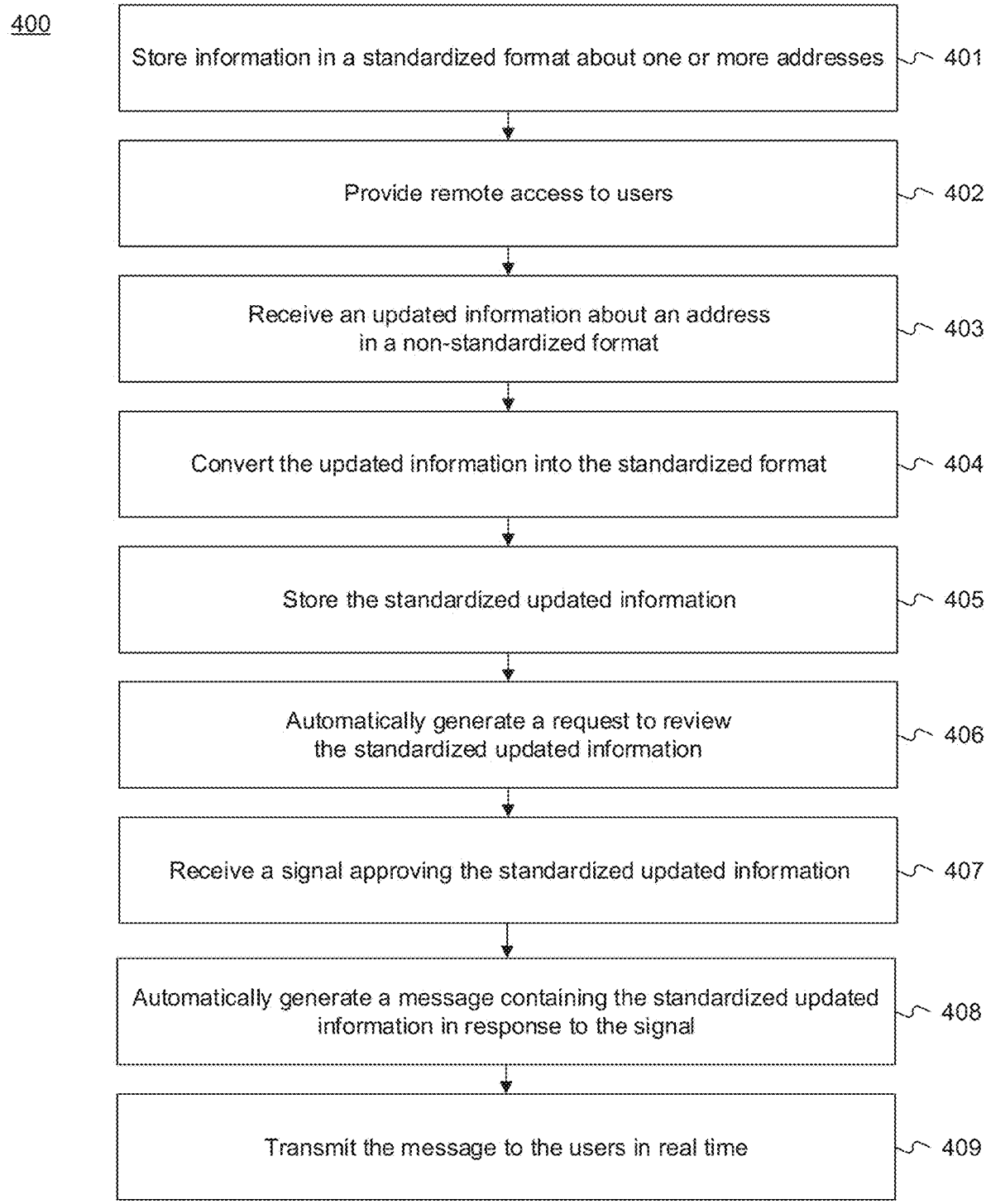
FIG. 4 is a flowchart of an exemplary computerized process for collection, management, and distribution of data with a crowdsourced knowledge database, consistent with the disclosed embodiments.

FIG. 4 depicts a flowchart of an exemplary computerized process 400 for receiving and distributing a new knowledge entry submitted by a user. Process 400 may be performed by TMS 310 in communication with KDB 313. Process 400 is an exemplary embodiment of a process adopted for a particular use case in the context of an e-commerce company, utilizing KDB 313 for maintaining a repository of delivery tips submitted by its delivery workers. However, aspects of process 400 are widely applicable to different use cases, and process 400 may be modified and adopted to accommodate other use cases as appropriate.

During normal operation, at step 401, TMS 310 may store, in KDB 313, information associated with one or more addresses in a standardized format. As described above with respect to FIG. 3, the information may be organized in a predetermined structure, where each element of the structure may correspond to a postal address. In this way, KDB 313 is configured to store a collection of geographical records, where each geographical record (i.e., an element) corresponds to a postal address.

In some embodiments, the elements may comprise community elements and unit elements, where each community element comprises a group of unit elements that correspond to individual units within a community. For example, a community element may correspond to an apartment complex with a single postal address, wherein the community element comprises a plurality of unit elements corresponding to individual residence units within the apartment complex.

In further embodiments, each element may be associated with one or more knowledge entries representing a delivery tip useful for delivering a package to the corresponding address. In some embodiments, knowledge entries may be categorized into different types such as access code entries, warning toggle entries, or descriptive entries, each of which will be described in more detail below. Each knowledge entry may comprise various types of data such as text, image, video, sound, GPS tag, or the like.

At step 402, TMS 310 may provide access to users over network 360, so that any one of the users can view or update the information stored in KDB 313. In some embodiments, the users may access KDB 313 via client devices 340A-340C or admin devices 350A-350B to view existing knowledge entries, submit new knowledge entries, or manage previously submitted knowledge entries in real time or near real time, even when another user may be accessing the same knowledge entry. The process and UI with which a user may access knowledge entries stored in KDB 313 are described below with respect to FIGS. 5-7.

At step 403, TMS 310 may receive an updated information about an address among the collection of geographical records. In some embodiments, the updated information may comprise a new knowledge entry associated with an address with a corresponding element stored in KDB 313. In other embodiments, the updated information may comprise a modified knowledge entry associated with an address with a corresponding element stored in KDB 313. The process and UI with which a user may submit updated information are described below with respect to FIGS. 8A-8C.

In some embodiments, the updated information (e.g., new or modified knowledge entry) may come in a non-standardized format. As used herein, a knowledge entry in a non-standardized format refers to any entry that was submitted without following one or more guidelines for using KDB 313. In some embodiments, such guidelines may comprise selecting a correct category appropriate for the type of knowledge submitted; submitting text data in a prespecified language (e.g., English); submitting images, videos, or audio files that are clearly recognizable; or the like. In some embodiments, a non-standardized information may also comprise information unreadable by TMS 310 due to hardware or software mismatch between the submitting client device (e.g., any of client device 340A-340C) and TMS 310.

At step 404, TMS 310 may convert the knowledge entry in a non-standardized format into the standardized format. In some embodiments, such conversion may comprise translating any text data submitted in a foreign language; adjusting one or more parameters of image, video, or audio files to enhance its quality (e.g., changing brightness or contrast of an image or a video; adjusting volume of an audio file; removing noise from the image, video, or audio files); or the like. In further embodiments, TMS 310 may parse the knowledge entry, recognize certain phrases or keywords to determine the type of knowledge submitted, and convert the knowledge entry into a correct category. For example, TMS 310 may recognize: that a knowledge entry contains an access code and convert the entry into an access code entry; or that the entry is instructing a delivery worker not to ring doorbell and convert the entry into a corresponding warning toggle entry.

At steps 405 and 406, TMS 310 may store the standardized updated information into KDB 313 and generate a request to review the standardized updated information. Here, TMS 310 may break down the standardized updated information into individual knowledge entries, each corresponding to an element in KDB 313. TMS 310 may then assign each knowledge entry to respective element, storing them in KDB 313, and generate a request to review the knowledge entries (collectively the standardized update information). In some embodiments, TMS 310 may transmit such requests to admin devices 350A-350B, in response to which a user may review and approve or reject one or more knowledge entries included in the standardized updated information. In some embodiments, the reviewing users may be a subset of the users accessing KDB 313 and/or bestowed with special privileges for managing contents of KDB 313. The process and UI with which the reviewing users access the requests and review the updated information are described below with respect to FIGS. 9-12. In some embodiments, the reviewing users may submit new knowledge entries using admin devices 350A-350B. The process and UI for submitting such new knowledge entries are also described below.

Once a user has reviewed and approved a knowledge entry, admin device 350A-350B may generate a signal associated with the approval of the knowledge entry. At step 407, TMS 310 may receive this signal approving the knowledge entry (or collectively, standardized updated information).

At steps 408 and 409, in response to the received signal, TMS 310 may generate and transmit a message containing the standardized updated information via network 360. In some embodiments, TMS 310 may transmit the messages as a server push or a push notification, where it is TMS 310 that initiates the data transfer rather than the receiving client devices 340A-340C. Such embodiments allow TMS 310 to transmit the message in real time or near real time, so that each user has immediate access to up-to-date information.

While the steps of process 400 are described in sequence, it may be desirable in some embodiments to provide users with an uninterrupted access to the information stored in KDB 313. In this way, users are always able to view knowledge entries or submit new entries at any time through client devices 340A-340C, and reviewing users are able to view requests for review of knowledge entries at any time through admin devices 350A-350B. Untethering the submission of new knowledge entries and the review of the new knowledge entries allows each user to continue accessing the information stored in KDB 313 and give them flexibility in completing their respective tasks at their schedule. For example, a reviewing user may allow multiple requests to accrue before approving them.

It is noted, however, that while the users are allowed to submit and review updated information at their own pace, TMS 310 may process the other steps of process 400 without a delay. For example, once TMS 310 receives an updated information at step 403, TMS 310 may convert the updated information to a standardized format, store the standardized updated information, and generate a request to review immediately. In this way, a new submission of a knowledge entry may be stored in KDB 313 and appear on an admin client (e.g., 350A) for review in real-time. The user that submitted the new knowledge entry may also be able to confirm his/her submission on a client device (e.g., 340A) in real-time. Similarly, once TMS 310 receives the signal approving the standardized updated information at step 407, TMS 310 may process the corresponding knowledge entry and have it accessible by any user accessing KDB 313 via client devices 340A-340C or admin devices 350A-350B.

FIGS. 5-8 depict embodiments of an exemplary UI for viewing information stored in KDB 313 along with other useful information received from external databases such as recipient database 320 and shipment database 330, consistent with the exemplary use case disclosed herein. It should be noted that while the UIs are depicted as a mobile app, such implementation is not exclusive and the UIs may take the form of a website, web app, computer application, software developed for a dedicated hardware device, or the like. It is also noted that UIs depicted in FIGS. 5-8 only serve to represent how the UIs may appear for a particular user accessing KDB 313 through a client device (e.g., 340A). The layouts and graphical user interface (GUI) elements depicted in FIGS. 5-8 are only exemplary, and other variations with more or fewer elements or with different layouts are contemplated.

Figure 5B:
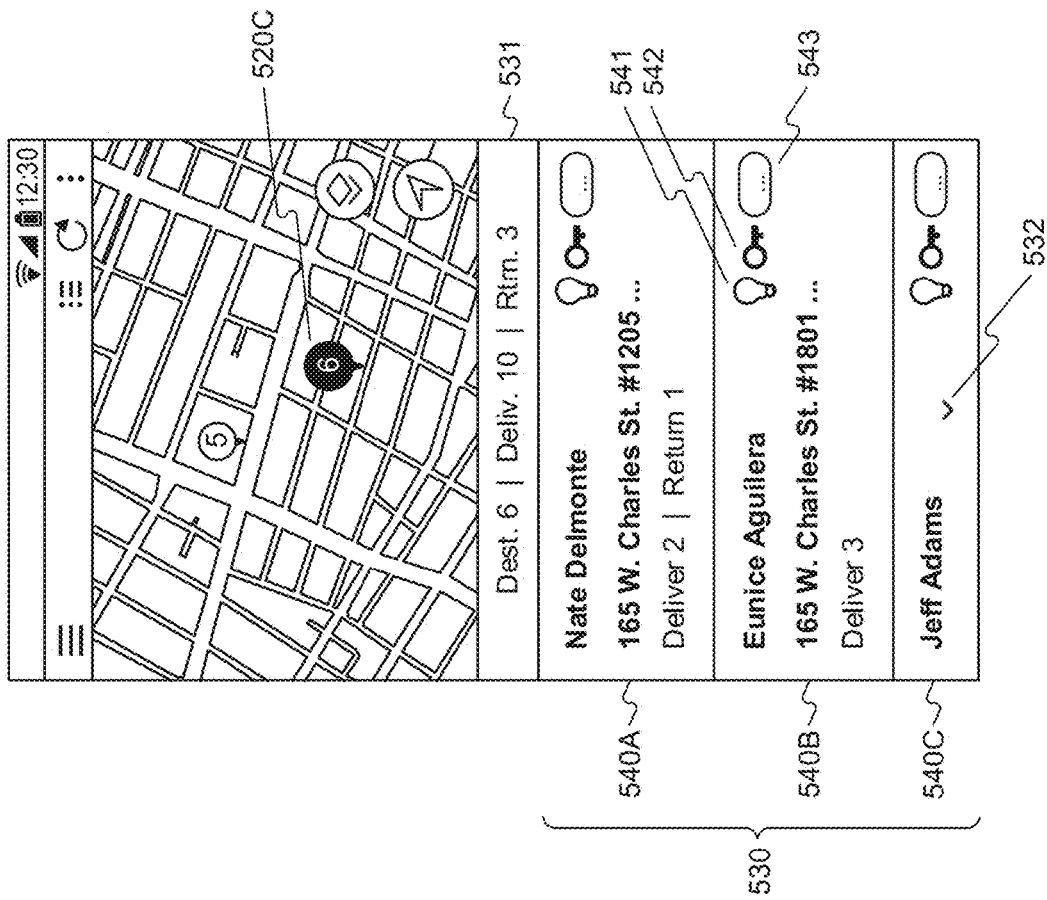
FIGS. 5A-5B are exemplary embodiments of an overview user interface (UI) with which a user can view records stored in the database, consistent with the disclosed embodiments.
Figure 5A:

FIGS. 5A and 5B are exemplary embodiments of an overview UI 500 that displays a map 510 of a geographical area. Map 510 may be sourced from any known map providers such as Google Maps or Apple Maps, or may be custom developed. In some embodiments, overview UI 500 may display the map in a manner substantially similar to third-party map applications that users may be accustomed to, which may lower the learning curve for many users because they are already used to the interface.

In some embodiments, map 510 may display one or more location markers (e.g., 520A-520B). Location markers may appear at the location of a destination on map 510 with a number inside the marker (e.g., 5 for location marker 520A) that represents the number of packages to be delivered to or received from the destination. In some embodiments, one location marker may represent a plurality of destinations that are in close proximity to each other. In this case, the number inside the marker may represent the number of destinations that the location maker represents. For example, location marker 520C of FIG. 5B has number 6, which represents the number of destinations that the user must visit.

Referring to FIG. 5B, overview UI 500 is modified to show a list pane 530 that displays information on the destinations represented by location marker 520C. In some embodiments, the color of location marker 520C may change to signify that the information shown on list pane 530 corresponds to location marker 520C. Other embodiments may use other methods of visual identification to signify the selection.

In some embodiments, list pane 530 comprises a group summary bar 531 and destination summaries 540A-540C. Group summary bar 531 may display different parameters related to a particular location marker (e.g., location marker 520C), which can include the number of destinations represented by the location marker (e.g., 6 for location marker 520C), the total number of packages to be delivered to the destinations represented by the location marker (e.g., 10 for location marker 520C), and the total number of packages to be picked up from the destination for return (e.g., 3 for location marker 520C).

Turning to destination summaries 540A-540C, each destination summary may correspond to an element in KDB 313 associated with a particular postal address. For example, destination summary 540A corresponds to an element associated with 165 W. Charles St. #1205, New York, N.Y. Each destination summary (e.g., 540A) may also display other related information received from external databases such as recipient database 320 and shipment database 330 described above. For example, destination summary 540A may display the name of the customer associated with the address and the number of packages to be delivered and picked up at the address. In some embodiments, list pane 530 may further comprise scroll arrow 532 to represent that a portion of information shown in list pane 530 is outside of overview UI 500.

In some embodiments, destination summary 540A may also display different icons (e.g., 541 and 542) that represent presence of one or more knowledge entries associated with the address. For example, a lightbulb icon 541 may represent that there is at least one knowledge entry associated with the address and a key icon 542 may represent that there is at least one knowledge entry for an access code to get to the address. In some embodiments, selecting either lightbulb icon 541 or key icon 542 may display the corresponding knowledge entry stored in KDB 313.

In further embodiments, destination summary 540A may also display a detail button 543, which the user can select to display a more detailed information about the corresponding destination. It is important to note that, while all three destination summaries 540A-540C of FIG. 5B includes both lightbulb icon 541 and key icon 542, the presence of icons is based on the type of knowledge entry associated with the corresponding element in KDB 313. For example, a destination summary for an address that does not have any associated knowledge entry in KDB 313 would not include any of the icons.

FIGS. 6A and 6B are exemplary embodiments of a list view UI 600 for displaying a more detailed view of destinations. In some embodiments, the user may switch between overview UI 500 and list view UI 600 by selecting a button (not shown) to choose a desired UI. Referring to FIG. 6A, list view UI 600 may serve as an alternative layout for displaying elements stored in KDB 313, where the records that appear upon selection of a location marker (e.g., 520C) are displayed in a list of destination detail panes 610A and 610B. In some embodiments, the user may be able to search for a particular element, filter certain elements, or refresh the displayed information using control buttons 601. For ease of description and comparison, the element shown in destination detail pane 610A is the same element shown in destination summary 540A of FIG. 5B.

In some embodiments, destination detail pane 610A may comprise an access code section 611, an icon section 612, and a top entry section 613 along with basic information such as the name of the recipient at the destination and the address. Access code section 611 may display known access codes necessary for reaching the destination address. In some embodiments, information displayed in access code section 611 may include those from access code entries associated with the unit element corresponding to the destination address or the community element associated with the unit element. For example, an access code entry associated with the corresponding unit element in KDB 313 may contain an access code necessary for opening a mailbox at the destination. In another example, the unit element may be an apartment unit inside an apartment complex with a corresponding community element that has an access code entry for the main entrance access code. In this case, access code section 611 may display two access codes, one for the main entrance and the other for the mailbox.

Icon section 612 may display various icons that indicate presence of one or more knowledge entries (e.g., with the lightbulb icon) and warning toggle entries (e.g., with the "no bell" and "no knock" icons). Icon section 612 may display such icons based on knowledge entries associated with the unit element and/or the community element corresponding to the destination. For example, the "no bell" icon and the "no knock" icon depicted in FIG. 6A indicates that the corresponding unit element and/or the community element have respective warning toggle entries. In some embodiments, warning toggle entries may include common warnings such as no bell, no knocking, pets present, etc. In some embodiments, presence of a lightbulb icon may indicate that there are knowledge entries associated with the destination, which may prompt the user to refer to the knowledge entries.

Top entry section 613 may display snippets of the most used descriptive entries so that they are readily observable by the user without navigating deeper into the UI as depicted in FIG. 6B. In some embodiments where there are only a couple of knowledge entries associated with the destination and all of them are displayed in top entry section 613, icon section 612 may remove the lightbulb icon because no other entries are available.

Referring to FIG. 6B, the user may select a destination displayed in destination detail pane (e.g., 610A) to display a destination detail UI 620. Destination detail UI 620 may display all information available for a particular destination and present options for submitting new knowledge entries. In some embodiments, destination detail UI 620 may include a new entry section 621, an access code entry section 623, a descriptive entry section 625, and a warning toggle entry section 627.

New entry section 621 may include a button for submitting a new knowledge entry as well as knowledge entry count 622 that displays the number of knowledge entries associated with a community element and a unit element corresponding to the currently selected destination. The process and UI for submitting a new knowledge entry are described below with respect to FIG. 8A-8C.

Access code entry section 623, descriptive entry section 625, and warning toggle entry section 627 each display respective categories of knowledge entries associated with the community element and the unit element corresponding to the currently selected destination. In some embodiments, access code entry section may also include submit a new code button 624 so that the user may add an access code quickly. In some embodiments, descriptive entry section 625 may be divided into different sections that display different descriptive entries associated with the community element and the unit element. In further embodiments, descriptive entry section 625 may also include a section for displaying recipient-submitted requests. Recipient-submitted requests may refer to specific type of knowledge entries submitted to KDB 313 through admin devices 350A-350B that reflect requests manually requested by the recipient of the currently selected destination.

UI elements for knowledge entries depicted in FIGS. 6A-6B are configured to be displayed in response to a user's interaction with the UIs. In some embodiments, however, TMS 310 may configure certain knowledge entries to appear without any interaction from the user. Such knowledge entries may appear as a notification on client device 340A-340C based on the location of the client device. The location may be sensed by any means of determining a geographical location such as a GPS sensor, cellular triangulation, Bluetooth location tracking, or the like. For example, a knowledge entry associated with a particular address may pop up on a client device as a notification when the user approaches the address. The knowledge entries displayed in this manner may be those considered critical to a successful completion of a task or those preconfigured to be displayed. This process of displaying certain knowledge entries may allow even non-regular users or users that do not "drill down" to review each individual knowledge entry to take note of important knowledge entries.

Figure 7B:
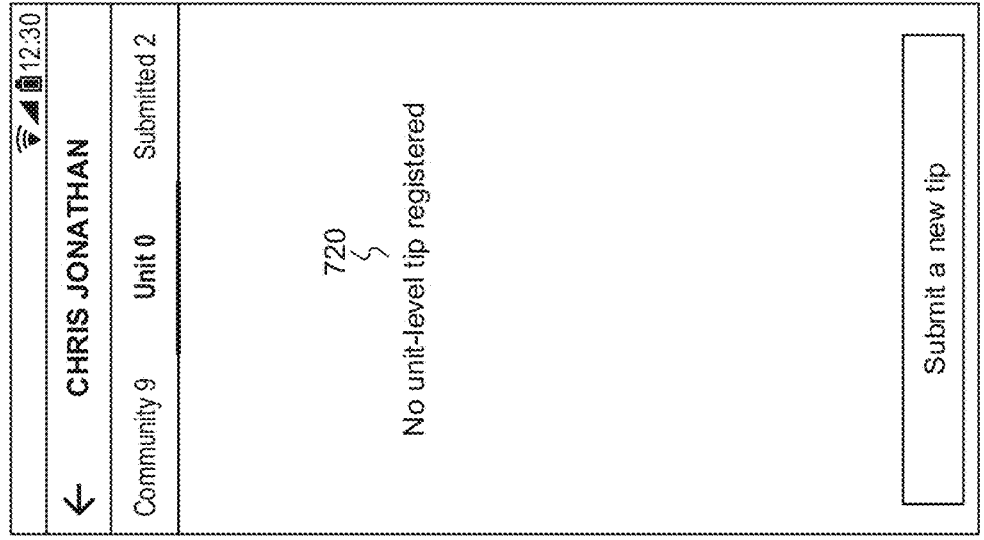
Figure 7A:
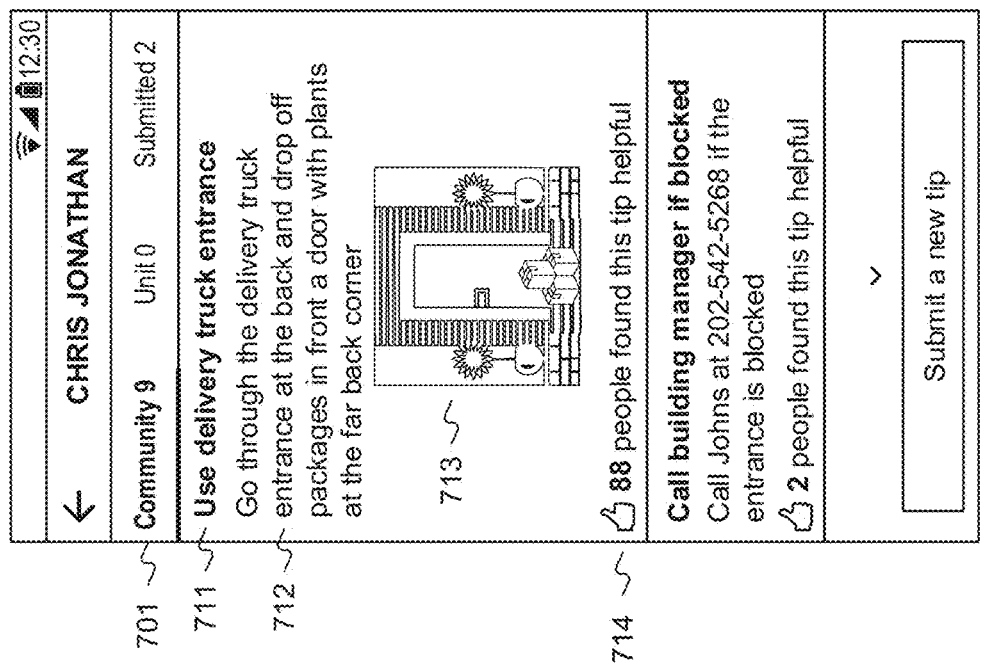
Figures 7C, 8A:
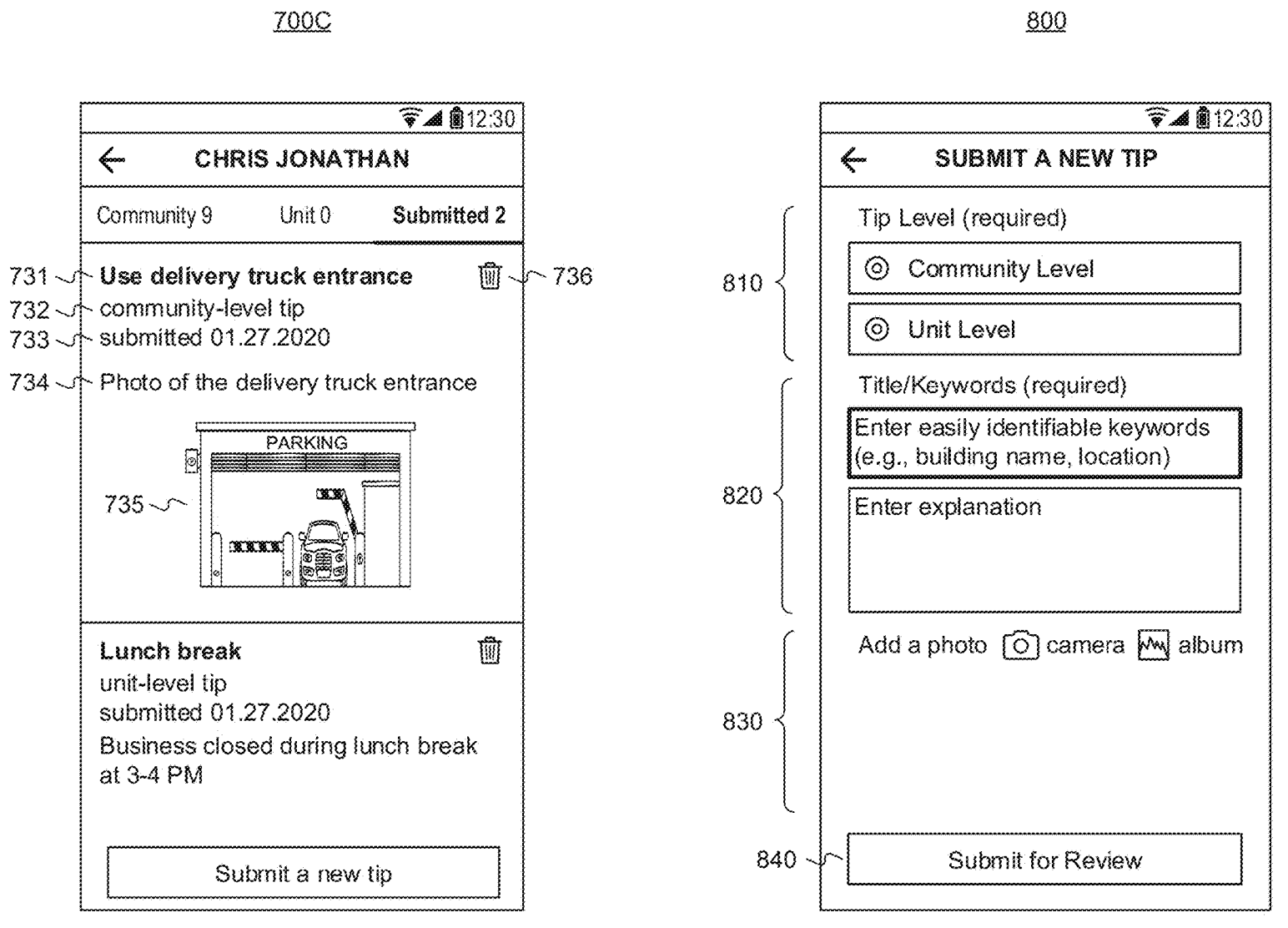

FIGS. 7A-7C depict different layouts of knowledge entry view UI, which displays different knowledge entries associated with a particular destination. In some embodiments, the UIs depicted in FIGS. 7A-7C may appear when a user selects the entry count 622 shown in FIG. 6B. A user may switch between the different layouts depicted in FIGS. 7A-7C by selecting the desired tab in a view selection tab 701.

FIG. 7A depicts a community-level entry view UI 700A, which displays all community-level entries associated with the currently selected destination. For example, the community element associated with the destination depicted in FIG. 7A has 9 community-level entries in KDB 313. In some embodiments, community-level entry view UI 700A may display each of the entries in sequence along with detailed information including its title (711), description (712), any image/video/audio attachment (713), and helpfulness metric (714). In some embodiments, helpfulness metric 714 may be the number of times other users have indicated that a particular knowledge entry is helpful. In some embodiments, the knowledge entry view UIs depicted in FIGS. 7A and 7B may display relevant knowledge entries in the order of their helpfulness metrics. Other methods of sorting the entries are also equality applicable, such as sorting by the date of submission, most comments, or the like. In some embodiments, helpfulness metric 714 may be used as an incentive to promote submission of new and helpful knowledge entries.

FIG. 7B depicts a unit-level entry view UI 700B, which displays all unit-level entries associated with the currently selected destination. For example, the unit element corresponding to the destination depicted in FIG. 7B has no unit-level entries in KDB 313. In this case, unit-level entry view UI 700B may simply display a blank screen or a notice 720. In other exemplary cases where there are unit-level entries, unit-level entry view UI 700B may display the unit-level entries in a manner similar to community-level entry view UI 700A of FIG. 7A.

In further embodiments, community-level entry view UI 700A and/or unit-level entry view UI 700B may provide a way for users to report incorrect or improper knowledge entries or leave comments as desired. Such feature may promote a sense of self-policing or a community among the users who are otherwise strangers. In some embodiments, TMS 310 may determine that certain knowledge entries are obsolete or irrelevant. Such determination may be based on the age of the entries, level of interaction (e.g., comments, likes) received from users, or any combination thereof. TMS 310 may decide to display these entries after other more helpful or recent entries or remove them from view. Additionally or alternatively, TMS 310 may generate a request to review such obsolete knowledge entries FIG. 7C depicts a user-submitted entry view UI 700C, which displays all user-submitted entries associated with the currently selected destination and submitted by the current user. For example, there are two user-submitted entries submitted by the current user as depicted in FIG. 7C. As used herein, user-submitted entries are those that TMS 310 received at step 403 of FIG. 4 but have not been reviewed and approved by a reviewing user at step 407. In some embodiments, user-submitted entry view UI 700C may display the user-submitted entries in the original version as submitted or in the standardized format converted at step 404. In some embodiments, each user-submitted entries are displayed with detailed information such as its title (731), entry level (732), submission date (733), description (734), and any attachment (735). In some embodiments, user-submitted entry view UI 700C may also display delete icon 736 next to each user-submitted entry. The user may select delete icon 736 at any time to cancel submission of the entry and remove it from KDB 313.

Figures 8B, 8C:
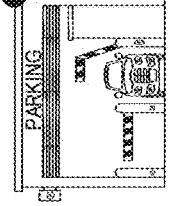

FIGS. 8A-8C depict exemplary embodiments of a new knowledge entry submission UI 800. A user may use this UI to submit a new knowledge entry as described above with respect to FIG. 4. TMS 310 may then process the new knowledge entry and request it for review as also described above. In some embodiments, new knowledge entry submission UI 800 may determine the appropriate element to which the new knowledge entry should be assigned based on context. For example, when new knowledge entry submission UI 800 is displayed in response to a user input while the user was accessing knowledge entries assigned to a particular destination, new knowledge entry submission UI 800 may determine that the new knowledge entry should be assigned to an element in KDB 313 corresponding to the current destination. In other embodiments, new knowledge entry submission UI 800 may use location data from the client device (e.g., 340A) or request a manual input of an address from the user.

Referring to FIG. 8A, new knowledge entry submission UI 800 may generally comprise three sections: an entry level selection section 810, a description section 820, and an attachment section 830. Each section may be configured to receive corresponding input from the user as are apparent from the UI elements depicted. Once an entry is complete, the user may select a submit button 840 to transmit the knowledge entry to TMS 310, which will receive the knowledge entry at step 403 of FIG. 4 and begin subsequent processes described above. FIGS. 8B and 8C depict a new knowledge entry submission UI 800 after a user has entered some input. For example, a radio button 811 of FIG. 8B is highlighted to indicate that the current knowledge entry should be assigned to a community-level element. An attachment 831 of FIG. 8C displays a preview of an image or video to be submitted with the knowledge entry.

In some embodiments, TMS 310 may use the description entered into description section 820 to convert the knowledge entry into a standardized format at step 404 of FIG. 4. As described above, TMS 310 may parse the description to identify certain phrases or keywords that indicate that the knowledge entry should be categorized as an access code entry or a warning toggle entry instead of a descriptive entry.

FIGS. 9-12 depict embodiments of an exemplary UI for reviewing knowledge entries submitted by users, consistent with the exemplary use case disclosed herein. It should be noted that while the UIs are depicted as a software application, such implementation is not exclusive and the UIs may take the form of a website, web app, software developed for a dedicated hardware device, or the like. It is also noted that UIs depicted in FIGS. 9-12 only serve to represent how the UIs would appear for a particular user accessing KDB 313 through an admin device (e.g., 350A). The layouts and GUI elements depicted in FIGS. 9-12 are only exemplary, and other variations with more or fewer elements or with different layouts are contemplated.

FIG. 9 depicts a knowledge entry management UI 900 displaying a list of knowledge entries submitted by users. Knowledge entry management UI 900 may comprise a search toolbar 901, admin submission buttons 902, and a records table 900 of knowledge entry records. In some embodiments, search toolbar 901 may comprise various GUI elements (e.g., textbox, dropdown list, checkbox, date selector, etc.) that allow a user to specify certain criteria to display a subset of knowledge entries in KDB 313. Possible criteria are shown in search toolbar 901 (e.g., warehouse, route, invoice ID, etc.), but any information comprising a knowledge entry may be specified. Admin submission buttons 902 may be GUI elements that allow a user to submit new knowledge entries through knowledge entry management UI 900. Details of such process and associated UIs will be discussed below with respect to FIGS. 11A and 11B.

In some embodiments, records table 910 may display a subset of knowledge entries stored in KDB 313 based on the search criteria specified via search toolbar 901. Records table 910 may display each knowledge entry in rows with relevant information (e.g., review status, address, access code, delivery tip, user submitted, and date submitted). Alternative arrangements and displayed information are also contemplated. In some embodiments, different knowledge entry types such as an access code entry 920 and a descriptive entry 930 may be shown with a similar composition of information except for their respective contents associated therewith.

In some embodiments, access code entry 920 may display, in addition to other information such as status, address, user submitted, and date submitted, access code entry contents 921. Access code entry contents 921 may indicate whether access code entry 920 is a community-level entry or a unit-level entry, the new access code submitted in the corresponding knowledge entry, and the previous access code if available. For example, access code entry 920 depicted in FIG. 9 indicates that it is a community-level entry showing an access code of a particular community (e.g., front gate access code of an apartment complex), that the previous access code was 9049#, and that the new access code (whether because the community changed it or the previous code was wrong) is 3030#.

Similarly, descriptive entry 930 may display, in addition to other information common with access code entry 920, descriptive entry contents 931. Descriptive entry contents 931 may indicate whether descriptive entry 930 is a community-level entry or a unit-level entry and a title/keywords of the descriptive entry 930. In some embodiments, descriptive entry 930 may also display one or more attached images 932 if available.

A user may click on each knowledge entry to review details of its contents individually (as explained below with respect to FIGS. 10A and 10B) or select multiple entries using a checkbox 912 next to each entry to approve or deny the selected entries using quick action buttons 913. In some embodiments, a user may switch an approved knowledge entry to being denied, or vice versa based on different factors, including but not limited to helpfulness metric 714 discussed above.

FIGS. 10A-10B depict different versions of knowledge entry detail view UIs 1000A and 1000B. Knowledge entry detail view UIs 1000A and 1000B may appear in response to a user's selection of a knowledge entry displayed in records table 910. For illustrative purposes, knowledge entry detail view UI 1000A may represent a UI for displaying an access code entry (e.g., 920), and knowledge entry detail view UI 1000B may represent a descriptive entry (e.g., 930).

Referring to FIG. 10A, knowledge entry detail view UI 1000A may comprise entry details table 1010A. Entry details table 1010A may display various information associated with the currently displayed knowledge entry along with the access code submitted with the current knowledge entry. The submitted access code may be displayed in an access code box 1012, and a dropdown list 1011 may indicate whether the current knowledge entry is community-level or unit-level. In some embodiments, a user may be able to modify the submitted access code or the level using access code box 1012 or dropdown list 1011, respectively, or approve or deny the current knowledge entry using decision buttons 1020.

In some embodiments, knowledge entry detail view UI 1000A also comprise an entry type navigation bar 1030A, and a past entry records table 1040A. Past entry records table 1040A may display past knowledge entries of the same type selected on entry type navigation bar 1030A (i.e., community-level access code entries for FIG. 10A) that are available for the address associated with the current knowledge entry (e.g., "2232 Charles St. NE, New York, N.Y." in FIG. 10A). A user may be able to toggle between different types of knowledge entries by selecting a desired type on entry type navigation bar 1030A.

For example, past entry records table 1040B in FIG. 10B shows past entry records of community-level descriptive entries available for the same address, as indicated by the bold text in entry type navigation bar 1030B. Knowledge entry detail view UI 1000B is also changed to show a community-level descriptive entry associated with the same address.

In some embodiments, knowledge entry detail view UI 1000B of FIG. 10B, now showing a descriptive entry instead of an access code entry as in FIG. 10A, may further comprise additional GUI elements configured to display the contents of the descriptive entry. For example, entry details table 1010B may comprise, in addition to the common elements dropdown list 1011 and decision buttons 1020, a title box 1013, an explanation box 1014, and one or more submitted attachments 1015.

Figure 11B:
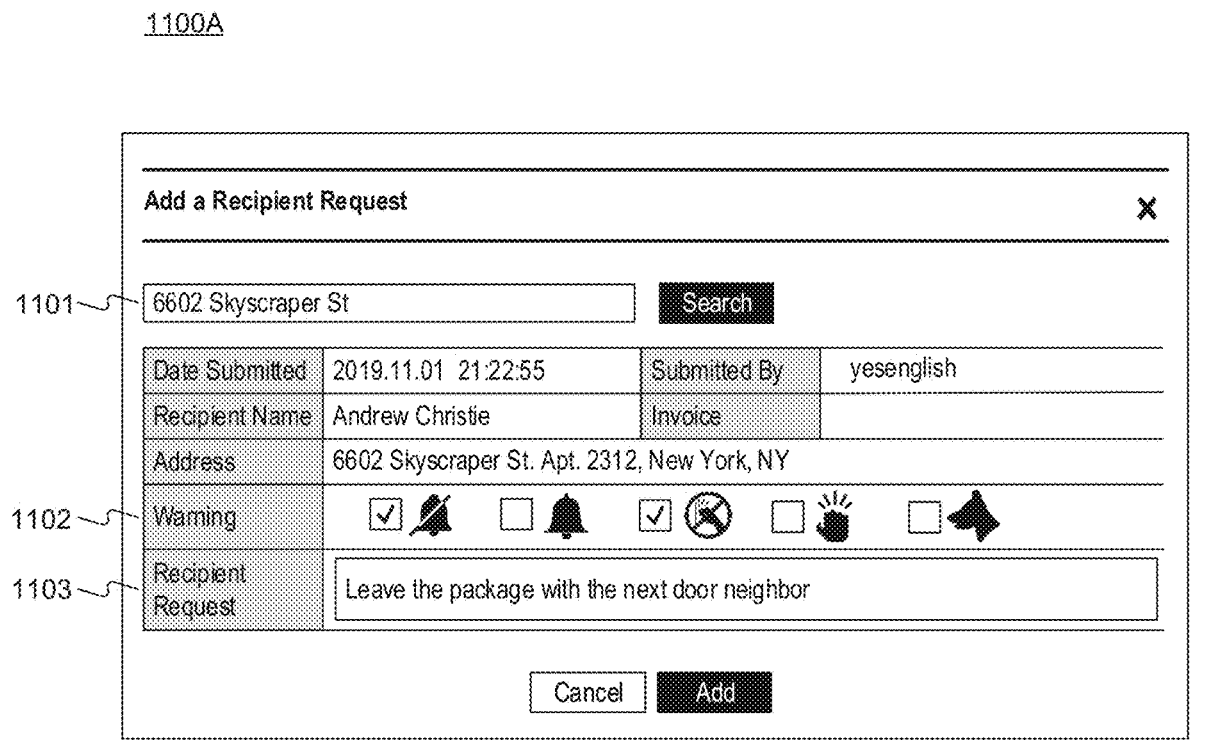

FIGS. 11A-11B depict admin knowledge entry submission UIs 1100A and 1100B, which may appear in response to a user input selecting admin submission buttons 902. Admin submission buttons 902 may be configured to allow a user to submit a new knowledge entry for an address based on information gathered from business operations (e.g., an apartment complex may arrange with a delivery company to provide its community-level access code or instructions for delivery workers), via admin knowledge entry submission UI 1100A, or directly received from recipients, via admin knowledge entry submission UI 1100B.

Referring to FIG. 11A, admin knowledge entry submission UI 1100A may comprise a search box 1101 and an admin entry details table 1110. In some embodiments, search box 1101 may allow a user to input different parameters (e.g., keywords, identifiers, an address, etc.) to identify a particular address or recipient for whom the user wishes to enter a knowledge entry. Once the address or recipient is found, admin entry details table 1110 may display associated information as shown, for example, and provide different GUI elements for the user to enter corresponding information as needed.

FIG. 11B shows another version of admin knowledge entry submission UI 1100B for submitting a recipient's request. A recipient's request may comprise, for example, various warnings 1102 (e.g., no door bell, no knocking, beware of pets) or specific instructions 1103 for delivering a package. Such requests may be received, for example, via external front end system 103. In some embodiments, these recipient-provided requests may be provided prominently to delivery workers such as descriptive entry section 625 depicted in FIG. 6B.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for collection, management, and distribution of data with a crowdsourced knowledge database, the system comprising:
   a memory storing instructions; and
   at least one processor configured to execute the instructions for:
      storing information in a standardized format about one or more addresses in one or more network-based non-transitory storage devices having a collection of geographical records stored thereon;
      providing remote access to users over a network so any one of the users can update the information about an address in the collection of geographical records in real time through a graphical user interface, wherein the one of the users provides the updated information in a non-standardized format dependent on a hardware and software platform used by the one of the users;
      generating a request containing the updated information, wherein the request is reviewed by a subset of the users with special privileges;
      receiving an approval of the updated information;
      converting the updated information into the standardized format;
      storing the standardized updated information about the address in the collection of geographical records in the standardized format;
      generating a message containing the updated information about the address whenever updated information has been stored and in response to receiving the approval; and
      transmitting the message to all of the users over the network in real time, so that each user has immediate access to up-to-date information.

2. The computer-implemented system of claim 1, wherein the one or more addresses are organized into a plurality of groups, each group including a subset of the one or more addresses sharing a common entry point.

3. The computer-implemented system of claim 2, wherein any one of the users can also update the information about a group among the plurality of groups.

4. The computer-implemented system of claim 1, wherein the users provide the updated information using mobile devices with secure connections to the one or more network-based non-transitory storage devices through the network.

5. The computer-implemented system of claim 4, wherein transmitting the message to all of the users over the network further comprises displaying a notification on the mobile devices based on a current location of each mobile device.

6. The computer-implemented system of claim 1, wherein the updated information comprises at least one of text data, image data, or GPS location data.

7. The computer-implemented system of claim 1, wherein the updated information is associated with one or more security codes for gaining access to the address.

8. The computer-implemented system of claim 1, wherein the updated information is associated with one or more preferences specified by a resident of the address.

9. A computer-implemented method for collection, management, and distribution of data with a crowdsourced knowledge database, the method comprising:
   storing information in a standardized format about one or more addresses in one or more network-based non-transitory storage devices having a collection of geographical records stored thereon;
   providing remote access to users over a network so any one of the users can update the information about an address in the collection of geographical records in real time through a graphical user interface, wherein the one of the users provides the updated information in a non-standardized format dependent on a hardware and software platform used by the one of the users;
   generating a request containing the updated information, wherein the request is reviewed by a subset of the users with special privileges;
   receiving an approval of the updated information;
   converting the updated information into the standardized format;
   storing the standardized updated information about the address in the collection of geographical records in the standardized format;
   generating a message containing the updated information about the address whenever updated information has been stored and in response to receiving the approval; and
   transmitting the message to all of the users over the network in real time, so that each user has immediate access to up-to-date information.

10. The computer-implemented method of claim 9, wherein the one or more addresses are organized into a plurality of groups, each group including a subset of the one or more addresses sharing a common entry point.

11. The computer-implemented method of claim 9, wherein the users provide the updated information using mobile devices with secure connections to the one or more network-based non-transitory storage devices through the network.

12. The computer-implemented method of claim 11, wherein transmitting the message to all of the users over the network further comprises displaying a notification on the mobile devices based on a current location of each mobile device.

13. The computer-implemented method of claim 9, wherein the updated information comprises at least one of text data, image data, or GPS location data.

14. The computer-implemented method of claim 9, wherein the updated information is associated with one or more security codes for gaining access to the address.

15. The computer-implemented method of claim 9, wherein the updated information is associated with one or more preferences specified by a resident of the address.

* * * * *